Patented Jan. 6, 1931

1,787,806

UNITED STATES PATENT OFFICE

HANS WEIDMANN, OF FRANKFORT-ON-THE-MAIN, GERMANY

PROCESS FOR SEPARATING ZINC SULPHATE FROM SODIUM SULPHATE

No Drawing. Application filed October 6, 1927, Serial No. 224,521, and in Germany October 7, 1926.

This invention relates to a method for making zinc salts from industrial solutions containing zinc sulphate and sodium sulphate, which for example are obtained from roasted pyrites containing zinc or in the manufacture of lithopone. Pyrites containing copper and zinc are generally first thoroughly roasted, then subjected to a chloridizing-roasting process and the soluble copper compounds obtained by this process are then extracted by solvents for these copper compounds. The solutions of copper compounds obtained are then treated with iron, in order to precipitate the copper as cement copper. The zinc salts remaining in the waste solutions from the precipitation process have until now not been recovered as no technically and economically satisfactory methods were known for this purpose.

It has now been found, that such solutions containing zinc sulphate and sodium sulphate may be easily worked up to pure zinc sulphate, if sulphuric acid is added to the solution. The zinc sulphate is then precipitated, upon concentrating the solutions by evaporation. The amounts of sulphuric acid added to the solutions are preferably such as are necessary for converting the sodium sulphate into sodium bisulphate. Even an excess of sulphuric acid for example an excess of over 10% such as 20% has proved to be of advantage for the recovery of pure zinc sulphate from the solutions. Instead of using sulphuric acid one may also employ industrial waste solutions containing sulphuric acid. Such waste solutions are for example obtained by the electrolysis of the zinc sulphate obtained as final product according to the invention.

From a solution containing about 300 g. zinc sulphate per liter and about 120 gr. sodium sulphate per liter half the amount of the present zinc sulphate is obtained in pure form, by adding an amount of sulphuric acid sufficient to convert the sodium sulphate into bisulphate to the solution and concentrating it at temperatures above 100° C. to about 60% of the volume of the starting material. The zinc sulphate is precipitated as monohydrate. A stronger concentration of the solution must be avoided, in order to prevent the crystallization of sodium sulphate together with the zinc sulphate. The remaining acid mother liquor may be used again in the process. When pyrites are worked up by chloridizing-roasting, the acid mother liquor may be used for the extraction of the soluble copper compounds.

The practical application of the invention for the recovery of zinc salts from roasted pyrites containing zinc takes place in the following manner:

By leaching with water or dilute acid the copper compounds from the products obtained by chloridizing-roasting of zinc- and copper-containing pyrites a solution is obtained which contains copper chloride, zinc sulphate and sodium sulphate. This solution is first freed from copper and if necessary from impurities, such as for example iron compounds and then worked up according to the invention.

As the solution obtained only has a small content of zinc sulphate and is practically saturated with sodium sulphate, it is advisable first to remove the greater amount of sodium sulphate by freezing the solution and to use the mother liquor again for leaching new pyrites, which have been subjected to a chloridizing-roast. From the solution obtained by this leaching process the copper is again precipitated as cement copper and the solution, which is already richer in zinc sulphate, is frozen in order to remove sodium sulphate from it. This process is repeated until the solution is saturated with zinc sulphate, which is generally the case after the third or fourth repetition. This repeated leaching process has the advantage, that a concentration of the solution by evaporation is avoided.

The obtained solution rich in zinc sulphate is then free from impurities by precipitating traces of copper with zinc and treating the solution for example with calcium hydrate and chloride of lime in order to remove other impurities such as iron and cobalt.

The obtained solution containing zinc sulphate and sodium sulphate is then worked up according to the invention. The yields of pure zinc sulphate are about 90% and more of the zinc present in the pyrites, whereas the yields of copper are 96–98% and of sodium sulphate 95% and more.

Examples 1. 1000 kg. roasted pyrites obtained by chloridizing-roasting and containing 2,5% Cu and 2,5% Zn are leached with 1 cbm. water and diluted sulphuric acid. The residue is then free from zinc and contains about 0,06% Cu. The solution containing copper and zinc obtained by the leaching process is digested with 100–150 kg. cement-copper, in order to precipitate the copper as cuprous chloride in accordance with the reaction: $CuCl_2 + Cu = 2CuCl$. The mother liquor obtained is then used for leaching a new charge of roasted pyrites and the solution obtained is again freed from copper. The solution is now so rich in sodium sulphate, that on cooling it to 5° C. about 200 kg. Glauber's salt are crystallized out from 1 cbm. solution. The leaching and removal of the copper and sodium sulphate from the solution is repeated, until the solution obtains about 300 gr. zinc suphate per liter. The impurities still present in the solution are then precipitated with zinc dust and lime.

To the purified solution containing about 300 gr. of zinc sulphate and 120 gr. of sodium sulphate per liter is added 130 kg. of 60° Bé. sulphuric acid for each cbm. of solution in order to convert the $Na_2SO_4$ into the highly soluble bisulphate.

The acid solution thus obtained is concentrated by evaporation at temperatures above 100° C. to a volume of 600 liters for each cbm. solution. During the evaporation about 165 kg. zinc sulphate monohydrate are crystallized from each cbm. solution. The acid mother liquor is used for the reduction of copper chloride by cement copper.

I claim:

1. Process for obtaining solid zinc sulphate from solutions containing zinc sulphate and sodium sulphate which comprises converting the sodium sulphate into bisulphate by the addition of sulphuric acid and separating zinc sulphate as its monohydrate by evaporating the solution at temperatures above 100° C.

2. Process for obtaining solid zinc sulphate from solutions containing zinc sulphate and sodium sulphate which comprises adding to the solution an excess of sulphuric acid over that required to convert the sodium sulphate to bisulphate and separating zinc sulphate as its monohydrate by evaporating the solution at temperatures above 100° C.

3. Process for obtaining solid zinc sulphate from solutions containing zinc sulphate and sodium sulphate obtained by leaching chloridizing-roasted pyrites containing copper and zinc, and removing copper and other impurities from the solution, which comprises converting the sodium sulphate to bisulphate by the addition of sulphuric acid, and separating zinc sulphate as its monohydrate by evaporating the solution at temperatures above 100° C.

4. Process for obtaining solid zinc sulphate from solutions containing zinc sulphate and sodium sulphate obtained by leaching chloridizing-roasted pyrites containing copper and zinc, comprising repeatedly leaching the roasted pyrites, with intermediate removal of copper and sodium sulphate from the leaching solution between each leaching, until the solution is enriched in zinc sulphate, thereafter adding sulphuric acid to convert the sodium sulphate to bisulphate, and separating zinc sulphate as its monohydrate by evaporating the solution at temperatures above 100° C.

In testimony whereof I affix my signature.

Dr. HANS WEIDMANN.